United States Patent [19]

Hollis

[11] Patent Number: 4,678,507

[45] Date of Patent: Jul. 7, 1987

[54] TREATMENT OF DROSS

[75] Inventor: Richard G. Hollis, Mount Isa, Australia

[73] Assignees: Mount Isa Mines Limited; Commonwealth Scientific & Industrial Organization, both of Australia

[21] Appl. No.: 767,272

[22] PCT Filed: Nov. 16, 1984

[86] PCT No.: PCT/AU84/00235

§ 371 Date: Jun. 18, 1985

§ 102(e) Date: Jun. 18, 1985

[87] PCT Pub. No.: WO85/02204

PCT Pub. Date: May 23, 1985

[30] Foreign Application Priority Data

Nov. 18, 1983 [AU] Australia .............................. PG2452

[51] Int. Cl.$^4$ ...................... C22B 13/00; C22B 15/00
[52] U.S. Cl. .......................................... 75/24; 75/63; 75/72; 75/77; 423/97
[58] Field of Search ................... 75/24, 63, 77, 72, 75; 423/97

[56] References Cited

U.S. PATENT DOCUMENTS

| 1,518,626 | 12/1924 | Whitley | 423/97 |
| 1,642,358 | 9/1927 | Chisholm | 75/24 |
| 2,217,981 | 10/1940 | Hallows | 75/24 |
| 2,343,760 | 3/1944 | Fleming et al. | 75/72 |

FOREIGN PATENT DOCUMENTS 619727 of 1927 Australia .
122016 8/1946 Australia .
2472277 3/1980 Australia .

Primary Examiner—Melvyn J. Andrews
Attorney, Agent, or Firm—Darby & Darby

[57] ABSTRACT

Lead constituents may be removed from a dross to produce a copper matte low in lead assay by melting the dross at temperature in excess of 900° C., allowing the molten dross to separate into a lead bullion layer and a matte layer, removing the lead bullion layer from the matte layer, then heating the matte layer to a temperature in excess of 1000° C., and removing the lead sulphide therefrom as a fume.

7 Claims, No Drawings

TREATMENT OF DROSS

TECHNICAL FIELD

This invention relates to a method for treatment of lead drosses, and more particularly to a pyrometallurgical method for removing lead constituents from the copper constituents of the dross.

The invention is herein described by way of example only with reference to dross obtained in the smelting of sintered lead concentrates but is not limited to drosses obtained from that process.

BACKGROUND ART

In the extraction of lead from lead ores by the sinter process, lead sinter is smelted in a blast furnace to produce bullion and slag which are separated externally to the blast furnace in a forehearth. Lead bullion from the forehearth is collected in cooling pots and then transferred to drossing kettles. Copper compounds with other impurities rejected from solution during cooling float to the surface in the drossing kettle. Coke, sawdust, and the like may be added to aid the formation of a dry powdery dross which is skimmed from the surface of the cooling lead. Sulphur may be added to remove final traces of copper from bullion.

Constituents of the skimmed off lead dross include about 20% by weight of lead sulphide, about 20% by weight of copper sulphide predominently as chalcocite, and about 50% by weight of entrained metallic lead metal. Minor amounts of antimony, arsenic and other impurities are also present. Typical assays for various types of dross are shown in Table I. It can be seen that it is not unusual for a dross of the type under discussion to have a lead assay of the order of 70% and a copper assay of from about 5% to about 35%.

Various methods have been proposed with the objective of recovering lead from dross. These include pyrometallurgical methods and hydroextractive methods. Of the pyrometallurgical methods U.S. Pat. Nos. 2,217,981 and 4,033,761 each describe processes in which lead bullion entrained in the dross is released but neither process enables recovery of bound lead present in the dross as lead sulphide, nor does either permit the copper to be recovered readily by virtue that the copper matte retains a high residual lead assay.

U.S. Pat. No. 4,333,763 provides a process which enables the copper constituents to be recovered with a sufficiently low lead content to be suitable for shipment to a copper refinery. In that process a pool of molten lead metal is first established and then metallic alkali metal, for example sodium metal, is incorporated in the lead pool. The lead sulphide bearing dross is added to the molten lead and alkali metal with stirring at a temperature not above 650° C. The alkali metal reacts with the lead sulphide to reduce the combined lead to metallic lead and subsequently a matte phase comprising sulphur compounds of the alkali metal together with copper is separated from the molten lead. The alkali metal sulphides may be leached from the matte phase. As the process permits the handling of recovered copper matte in a conventional copper refining process, the process has considerable economic advantages in comparison with earlier processes. However the requirement for metallic sodium renders the process expensive to conduct, especially at locations remote from sodium manufacture.

An object of the present invention was the development of a pyrometallurgical process which avoids the disadvantages of the process described in U.S. Pat. No. 4,333,763 and which in preferred embodiments would enable the copper constituents to be recovered sufficiently free from lead constituents to be able to be processed in a copper smelter with little or negligible increase in contamination.

DISCLOSURE OF THE INVENTION

According to one aspect the invention consists in a pyrometallurgical method for removing lead constituents from copper constituents of a dross comprising the steps of:

1. melting the dross at a temperature in excess of 900° C.;
2. allowing the molten dross to separate into a layer of lead bullion and a layer of matte;
3. removing the lead bullion layer from the matte layer;
4. heating the matte layer to a temperature in excess of 1000° C. and removing at least a major portion of the lead sulphide therefrom as a fume whereby to produce a copper matte low in lead assay; and
5. recovering the lead as fume.

PREFERRED EMBODIMENTS

Preferred embodiment of the invention will now be described by way of example only. Batches of dross having the composition shown in Table II were melted by addition to a slag contained in a vertical furnace heated by means of a submerged combustion lance at a temperature of from 950° C. to 1200° C. In each case a pool of molten lead formed as a layer which could be tapped off leaving a remaining molten matte layer comprising lead sulphide and copper sulphide. The composition of matte and metal is shown in Table III. The higher the temperature the more lead sulphide is eliminated and the greater the concentration of copper in matte.

The separated matte, substantially free of entrained bullion, but rich in lead sulphide was fed at 120 kg. per hour into a 250 kg. upright reactor heated by means of a submerged combustion SIROSMELT lance fed with an excess of oil to air (95% stoichiometry). Lead sulphide was removed by fuming, the lance combustion gases assisting removal of fume, and the fume was recovered in a bag house filter.

The residual copper matte had a composition comprising 80.3% copper, 17.1% sulphur and assayed 1.95% lead. The method thus produced a copper product with a lead to copper ratio which is acceptable for copper processing. After allowing for the cost of oil, operating costs were found to be much lower than the costs of operating a process in which sodium metal is consumed and other disadvantages of the sodium process are avoided.

The melting step may be performed at a temperature above about 900° C. although a temperature of 1000°–1200° C. is preferred. It is not essential that the liquid lead layer be separated from the matte and slag layers while both are molten. For example the melt could be cast and allowed to separate while cooling. The solidified layers may then be physically separated and the separated matte layer may be remelted for the fuming step. However it is economically preferable to tap-off the lead layer and to proceed directly from the liquation and separation to the fuming step.

Use of the SIROSMELT lance greatly assists the fuming step. A slag is used to protect the lance during the fuming for example a copper reverbratory furnace slag containing about 10% additional lime or a high lead oxide slag.

As will be apparent to those skilled in the art from the teaching hereof the process conditions may be varied to an extent without departing from the inventive concept hereof and such variations are deemed to be within the scope of this disclosure.

TABLE I

TYPICAL DROSS ASSAYS

| | Pb % | Cu % | As % | Ag g/t | S % |
|---|---|---|---|---|---|
| 1. Unrecycled coke dross fines (skimmed). | 65–75 | 8–11 | 0.6–0.8 | — | 6–9 |
| 2. Coke dross lumps (skimmed). | 40–65 | 17–35 | — | — | 10–11 |
| 3. Recycled coke dross fines (on kettle) | 50–65 | 20–35 | 1 | 1200 | |
| 4. Recycled coke dross (skimmed) | 65–70 | 11–15 | 0.4–0.8 | 2100 | |
| 5. Sulphur dross | 83–85 | 5–7 | — | — | 6–7 |

TABLE II

COMPOSITION OF DROSS SAMPLES

| Assay % Net | | Mineralogical Compositions | |
|---|---|---|---|
| Pb | 68.0 | PbS | 23.6% |
| Cu | 14.3 | Cu$_2$S | 15.7% |
| S | 6.46 | Cu$_3$As | 2.44% |
| As | 0.69 | Pb Metal | 47.6% |

TABLE III

% WEIGHT COMPOSITION OF MOLTEN DROSS

| | | Cu | Pb | S |
|---|---|---|---|---|
| 950° C. | Matte Layer | 29.5 | 54.2 | 14.5 |
| | Metal Layer | 1.25 | | |
| 1020° C. | Matte Layer | 35.6 | 49.5 | 15.0 |
| | Metal Layer | 1.6 | | |
| 1200° C. | Matte Layer | 55.6 | 26.6 | 17.5 |
| | Metal Layer | 2.0 | | |

I claim:

1. A pyrometallurgical method for separating lead constituents including lead and lead sulfide from copper constituents including copper sulfide of a dross essentially free of alkali metal additives, the process comprising in sequence:

melting the dross at a temperature in excess of 900° C.;

waiting for the molten dross to separate into a layer of lead bullion and a layer of matte, said matte containing copper and lead predominantly in the form of lead sulfide;

removing the lead bullion layer;

heating the matte layer after removal of the lead bullion layer to a temperature in excess of 1000° C. by means of a combustion lance submerged in said matte causing at least a major portion of said lead sulfide to leave said matte in the form of lead sulfide fume thereby producing a copper matte sufficiently low in lead assay to be sent to a copper recovery operation without further treatment; and recovering said lead sulfite as lead fume.

2. The method of claim 1 wherein the step of melting the dross is conducted at a temperature within the range between 1000° and 1200° C.

3. The method of claim 1 wherein the step of melting the dross is conducted by means of combustion lance submerged in the melting dross.

4. The method of claim 2 wherein the step of melting the dross is conducted by means of a combustion lance submerged in the melting dross.

5. The method of claim 1 wherein said lead bullion layer is removed while in the liquid state.

6. The method of claim 2 wherein said lead bullion layer is removed while in the liquid state.

7. The method of claim 1 wherein said submerged combustion lance is fed with an excess of oil fuel to air at 95% stoichiometry.

* * * * *